United States Patent [19]

Young et al.

[11] 4,096,281

[45] Jun. 20, 1978

[54] METHOD AND COMPOSITION FOR PRODUCING FLAVORED POPCORN

[76] Inventors: Robert W. Young, 10 Gracie Sq., New York, N.Y. 10028; Samuel B. Prussin, 2126 Banyan Dr., Los Angeles, Calif. 90049; John L. Caccavale, 1812 Baxter St.; Victor J. Pierce, 2040 Vestal Ave., both of Los Angeles, Calif. 90026

[21] Appl. No.: 369,516

[22] Filed: Jun. 13, 1973

[51] Int. Cl.² .............................................. A23L 1/182
[52] U.S. Cl. ...................................... 426/89; 426/93; 426/307; 426/309
[58] Field of Search ............... 426/289, 294, 307, 302, 426/89, 93, 96, 103, 351, 98, 99, 113

[56] References Cited

U.S. PATENT DOCUMENTS

| 2,240,759 | 5/1941 | Chandler | 426/99 |
| 2,445,226 | 7/1948 | Landers | 426/99 X |
| 3,495,988 | 2/1970 | Balassa | 426/98 X |
| 3,519,439 | 7/1970 | Dunn | 426/111 |
| 3,704,133 | 11/1972 | Kracauer | 426/103 X |
| 3,851,574 | 12/1974 | Katz et al. | 426/211 |
| 3,867,556 | 2/1975 | Darragh et al. | 426/98 |

Primary Examiner—Raymond N. Jones
Attorney, Agent, or Firm—Paul R. Wylie

[57] ABSTRACT

Flavored popcorn is produced by preparing a composition of popcorn kernels, a cooking oil medium and encapsulated flavoring substances which can be introduced into a cooking vessel.

9 Claims, No Drawings

METHOD AND COMPOSITION FOR PRODUCING FLAVORED POPCORN

This invention relates generally to the production of popcorn and more specifically to the production of flavored popcorn. According to the invention, it is possible to flavor popcorn at the same time it is being popped, in contrast to prior art methods in which flavors were applied by spraying, pouring and/or mixing after the popping step. A feature of the invention is the utilization of encapsulated flavoring substances which are found to impart a variety of selected flavors uniformly to the popped corn.

The principle object of the invention is the provision of a flavored popcorn which can be prepared either commercially or in the home.

Another object of the invention is the provision of a flavored popcorn product which will have uniform flavoring.

Another object of the invention is the provision of a method and composition which can be used in the home and result in an acceptable snack food which can be prepared by ordinary popcorn making methods in standard corn popping devices.

BACKGROUND OF THE INVENTION

Flavored popcorn per se is not new and such flavored popcorn products as "Craker Jack" brand flavored popcorn, caramel coated popcorn, cheese coated popcorn and popcorn balls are well known. All of the usual prior art methods require a flavoring step after the popping step wherein a flavoring substance is sprayed or poured on the popcorn, usually followed by mixing in an attempt to evenly apply the flavor to the popcorn. This prior art methodology has proven disadvantageous to the extent that it requires a separate flavoring step which is convenient and sometimes difficult to carry out either commercially or in the home, and further, the resulting product is sometimes unsatisfactory due to inadequate distribution of the flavoring on the popcorn. These prior art problems have been solved by the one step popping and flavoring technique of the present invention.

A further disadvantage of the prior art methods, and concomitantly an advantage of the present invention, is the generally limited variety of flavors available in flavored popcorn for home preparation. Pursuant to this invention a relatively large variety of flavors are available including for example spice, herb, fruit, meat and dairy flavors for one step flavored popcorn preparation.

DETAILED DESCRIPTION OF THE INVENTION

According to the invention there is provided a method and a composition for producing flavored popcorn which comprise in a broad aspect the combining of popcorn kernels in a cooking medium together with a flavoring substance following which the contents of the vessel are heated to pop the kernels while at the same time they are being flavored. A feature of the invention is the provision of a pre-mix having both the foregoing contemplated cooking medium and flavoring substance to which the popcorn kernels can be added in the cooking vessel. A further feature of the invention is the provision of a concentrated pre-mix where less than all the cooking medium used to pop the kernels is mixed with the flavoring substance following which an additional amount of cooking medium necessary to pop the corn kernels is introduced into the vessel. It is contemplated in a commercial context that the flavoring substances, pre-mix or concentrated premix, depending upon the circumstances, may be sold to the consumer either separately, or with popcorn kernels.

The cooking medium is preferably an oil or semi-solid or solid fat suitable for cooking purposes and particularly suitable for popping corn kernels. Examples of such oils or fats are soybean oil, cottonseed oil, safflower oil, corn oil, peanut oil, hydrogenated or partially hydrogenated vegetable oil, butter and the like.

In a preferred form of the invention the flavoring substances are in the form of liquids encapsulated in a suitable encapsulating medium. It has been found according to the invention that practically any liquid flavor capable of being encapsulated can be used. Presently preferred encapsulating media are acacia, starch and/or dextrins or other hydrocolloids and methyl cellulose which is particularly preferred.

It is thought that the encapsulated flavors produce particular advantages in the flavoring of popcorn in the present invention because the encapsulating medium inhibits the flavor from being extracted and subjected to volatilization, fractionation, decomposition and the otherwise destructive temperatures of popping.

In a typical encapsulating process according to the invention the encapsulating medium is supplied as a gum which is dissolved in water. The flavoring substance is then added and suspended in the gum solution. In forming the encapsulated flavoring substance the gum solution is sprayed into a drying tower and the water driven off by a countercurrent stream of dry air. It has been found that ratios of gum to flavoring substance in the range from and including 90 to 10 to and including 60 to 40 parts by weight produce the best results.

Methyl cellulose is preferred as an encapsulating medium because its solubility increases as the temperature decreases. Therefore, during the popping, methyl cellulose will be unaffected by the water driven from the kernel which otherwise might cause the encapsulating medium to dissolve with resulting loss of the flavoring substance by steam distillation or evaporation. The water might also cause the encapsulating medium to soften and result in clumping or caking. However, using methyl cellulose, the encapsulated flavor will remain intact and adhere to the outer surface of the popped corn until such time as the popped corn is eaten and the methyl cellulose is dissolved at the lower mouth temperature to release the flavoring substance. Moreover, the typical char point of methyl cellulose of about 580° F. is sufficiently above the popping temperature range of about 325° to about 550° F. to avoid charring or browning. Methyl cellulose has been found to have in addition the added advantage of giving a desireable mouth feel on the popped corn. Among the advantages of the present invention are the uniform distribution of flavoring. This is thought to be due to several factors present in the one step popping and flavoring process of the invention which causes intimate contact of popped and unpopped corn with the flavoring substances in their encapsulated form. The unpopped kernel is first soaked in the popping medium containing the encapsulated flavor which is further brought into contact with the expanding corn during the popping process. Because of its high surface area popped corn will adsorb the encapsulated flavor as well as absorb such when the popped corn cools and partial vacuums are created in the interstices thereof.

SPECIFIC EXAMPLES

The following Specific Examples illustrate the effectiveness of the invention.

EXAMPLE I

The following ingredients were introduced into a cooking vessel and heated to popping temperature.

| | |
|---|---|
| Encapsulated Bacon Flavor (using Polak's Frutal Works Inc Flavor PFW Imitation Bacon Flavor 520001 U | 5.8 grams |
| Safflower Oil | 55 cc's |
| Popcorn | 80.0 grams |

After the popcorn was popped it was salted and found to give a pleasing product with a decided bacon taste that was uniformly distributed.

EXAMPLE II

The following ingredients were introduced into a cooking vessel and popped in the same manner as in Example I.

| | |
|---|---|
| Encapsulated Bacon Flavor as in Example I | 5.8 grams |
| Micro fine salt | 6.0 grams |
| Mono-sodium Glutamate | 0.6 grams |
| Soybean oil | 55 cc's |
| Popcorn | 80.0 grams |

The resulting popcorn had a distinct bacon flavor and it was not found necessary to add salt.

EXAMPLE III

The following ingredients were popped in the manner of the preceeding Examples.

| | |
|---|---|
| Encapsulated Bleu Cheese Flavor using PFW Imitation Bleu Cheese Flavor O. S. 540016 | 3.6 grams |
| Soybean Oil | 55 cc's |
| Popcorn | 80.0 grams |
| Micro fine salt | 4.0 grams |

The resulting popcorn had a decided blue cheese flavor which was uniformly distributed and did not loose potency after several days.

EXAMPLE IV

The following ingredients were placed in a vessel as in the preceeding Examples and popped.

| | |
|---|---|
| Encapsulated Almond-Coconut Flavor using PFW Imitation Toasted Almond-Coconut Flavor FOL 610391 U | 4.4 grams |
| Saccharin | .065 grams |
| Soybean oil | 55 cc's |
| Popcorn | 80.0 grams |

The resulting popcorn had a sweet coconut-almond flavor.

EXAMPLE V

The following ingredients were placed in a cooking vessel and popped as in the preceeding Examples.

| | |
|---|---|
| Imitation liquid Bleu Cheese Flavor using the same flavor as in Example III but without encapsulation | 10 cc,s |
| Soybean Oil | 50 cc,s |
| Popcorn | 80.0 grams |

The resulting popcorn was found to have a very bitter taste with no taste of cheese.

A comparison of Examples III and V will indicate the advantage of using encapsulated flavoring substances. Other unencapsulated flavors have been tried according to the invention, however it has been found that generally the resulting popped corn will change in time from the original flavor, a phenomenon that does not occur when encapsulated flavors are used.

It should be noted that the encapsulated flavoring substances used according to the invention are of relatively small size so as to permit even distribution over the surface of the corn as it pops. Encapsulated flavoring substances having an average diameter of about 5 to 25 microns produced by a coacervation encapsulating process have been found suitable for the invention. Encapsulated flavoring particles produced by a spray-drying process of which 100 percent will pass a 100 mesh screen (U.S. Standard Sieve) and at least 50 percent will pass a 325 mesh screen have also been found satisfactory. To obtain uniformity of distribution it is desireable to have the density of the encapsulated flavoring particles as close to that of the cooking medium as possible.

We claim:
1. The method of producing flavored popcorn consisting essentially of:
 (a) combining popcorn kernels, a cooking medium for said popcorn kernels selected from the group consisting of oils, semi-solid fats or solid fats and encapsulated flavoring substance particles and introducing same into a cooking vessel; and,
 (b) heating said combined materials to pop said popcorn kernels.
2. The method according to claim 1 wherein said encapsulated flavoring substance is combined with said cooking medium to form a pre-mix and said pre-mix is combined with said popcorn kernels.
3. The method according to claim 2 wherein an amount of cooking medium in excess of that present in said pre-mix is added to the cooking vessel.
4. The method according to claim 1 wherein said encapsulated flavoring substances comprise methyl cellulose as the encapsulating medium.
5. A method according to claim 1 wherein said encapsulated flavoring substance particles have an average diameter of about 5 to 25 microns.
6. A composition for producing uniformly flavored popcorn, said composition consisting essentially of popcorn kernels, a cooking medium for said popcorn kernels selected from the group consisting essentially of oils, semi-solid fats or solid fats and an encapsulated flavoring substance particles.
7. A composition according to claim 6 wherein said flavoring substance comprises an artificial flavoring.
8. A composition according to claim 6 wherein said encapsulated flavoring substance comprises methyl cellulose as an encapsulating medium.
9. A composition according to claim 6 wherein said encapsulated flavoring substance particles have an average diameter of about 5 to 25 microns.

* * * * *